United States Patent
Kluge et al.

[11] Patent Number: 5,962,980
[45] Date of Patent: Oct. 5, 1999

[54] METHOD FOR REGULATING THE RANGE OF THE HEADLIGHTS OF A VEHICLE ACCORDING TO THE LOAD

[75] Inventors: Reinhold Kluge, Hallbergmoos; Frank Bilz, Munich, both of Germany; Wayne McElfatrick, Toyko, Japan

[73] Assignee: Bayerische Motoren Werke Aktiengesellschaft

[21] Appl. No.: 08/908,034

[22] Filed: Aug. 11, 1997

[30] Foreign Application Priority Data

Aug. 9, 1996 [DE] Germany ............... 196 32 206

[51] Int. Cl.$^6$ .................................................. H05B 37/02
[52] U.S. Cl. ........................................... 315/82; 307/10.8
[58] Field of Search ................... 315/82; 364/516; 307/10.8

[56] References Cited

U.S. PATENT DOCUMENTS

| | | | |
|---|---|---|---|
| 3,850,041 | 11/1974 | Seaman | 73/495 |
| 4,781,465 | 11/1988 | Demachi et al. | 356/371 |
| 4,985,847 | 1/1991 | Shioya et al. | 364/516 |

FOREIGN PATENT DOCUMENTS

| | | |
|---|---|---|
| 0 652 134 A1 | 5/1994 | European Pat. Off. . |
| 0 699 559 A2 | 1/1996 | European Pat. Off. . |
| 37 38 221 A1 | 2/1987 | Germany . |
| 42 02 908 A1 | 5/1993 | Germany . |
| 43 38 281 A1 | 11/1993 | Germany . |
| 40 19 690 A1 | 6/1990 | United Kingdom . |
| 40 17 856 A1 | 12/1991 | United Kingdom . |

*Primary Examiner*—Michael B Shingleton
*Attorney, Agent, or Firm*—Evenson, McKeown, Edwards & Lenahan, P.L.L.C.

[57] ABSTRACT

In a method for regulating the headlight range of a vehicle as a function of the load, the vehicle speed is also taken into account to increase or decrease the headlight range at high or low speed. With the vehicle at rest, the headlight range can be further reduced by contrast with a vehicle operating at a lower speed. The same applies to driving on a highway with a rough surface.

6 Claims, 2 Drawing Sheets

METHOD FOR REGULATING THE RANGE OF THE HEADLIGHTS OF A VEHICLE ACCORDING TO THE LOAD

BACKGROUND AND SUMMARY OF THE INVENTION

The invention relates to a method for regulating the range of the headlights of a vehicle according to the load.

Regulation such as referred to here includes not only a static adjustment of the headlight range corresponding to the load state of the vehicle (cargo in the trunk, number of passengers, etc.), but also to a dynamic form of regulation in which the range is kept constant regardless of the pitching movements of the vehicle.

Pitching of a vehicle around its transverse axis is a function of (among other things) vehicle speed, and at high speed frequently results in the front end of the car moving upward, with a corresponding change of the headlight range due to a corresponding reduction of the tilt of the headlights. Conversely, the tilt of the headlights is smaller at lower speeds since the vehicle then does not align itself or at least does so to a lesser degree. The inclination of the vehicle in the lengthwise direction depends on its geometry and spring characteristics, and can also depend for example on the level of the fuel in the tank and the air pressure in the tires.

In conventional automatic headlight range regulation systems, a sensor of some type determines the height of the vehicle body relative to the front and rear axles for example. From the difference with respect to the required level, it generates a correction signal to adjust the tilt of the headlights in a known manner for the purpose of keeping the headlight range constant. The term "headlight range" refers to the point where the main beam of the headlights strikes the surface of the road. The range is determined for example by using a vertical wall at a distance of about 10 meters in front of the vehicle. The main beam, assuming a headlight range of 50 meters, will drop off by ⅕ to ⅘ of the height of the headlights.

It is also known to compensate for the acceleration-dependent pitching movements of the vehicle that occur during acceleration and result in a corresponding change in the headlight range. All of these methods have in common the goal of achieving a constant headlight range of approximately 50 meters.

The value of 50 meters, however, is sufficient at low speeds. However, at high speeds, it is simply insufficient because in the time required for a driver to react, the vehicle can travel a distance that is several times this value. Conversely, when the vehicle is standing still, a range of 50 meters can be perceived by the driver as being too great.

The object of the present invention is to provide a method of the type recited at the outset which adjusts headlight range to the actual need of the driver.

This object is achieved by the method according to the invention, in which the headlight range is adjusted as a function of vehicle speed. That is, the headlight range is increased at higher speeds, so that the visual field is expanded, while at low speeds, however, the headlight range remains at the usual value of 50 meters as described above. In this manner, it is possible to illuminate the highway even with low beams in such fashion that the requirements of persons driving in traffic are taken into account. Of course blinding of oncoming traffic is also avoided while increasing the headlight range.

The change in headlight range can be continuous or in a more simplified approach, by a stepwise adjustment. A specific vehicle speed is associated with each step, above and below which the headlight range has defined values separated from one another by the step. The number of steps is arbitrary. It is possible for example to work with only one step. However it is equally possible to have a plurality of steps.

Other objects, advantages and novel features of the present invention will become apparent from the following detailed description of the invention when considered in conjunction with the accompanying drawings.

DESCRIPTION OF THE INVENTION

Due to safety and comfort considerations, as well as legal requirements, the headlight range of a motor vehicle is basically adjustable within a certain range of tolerance. The invention utilizes this tolerance range to perform a deliberate change in headlight range as a function of vehicle speed. A prerequisite of this, and a feature of an advantageous embodiment of the invention, is to perform the entire adjustment of the headlight range within the tolerance range.

Figure 1:
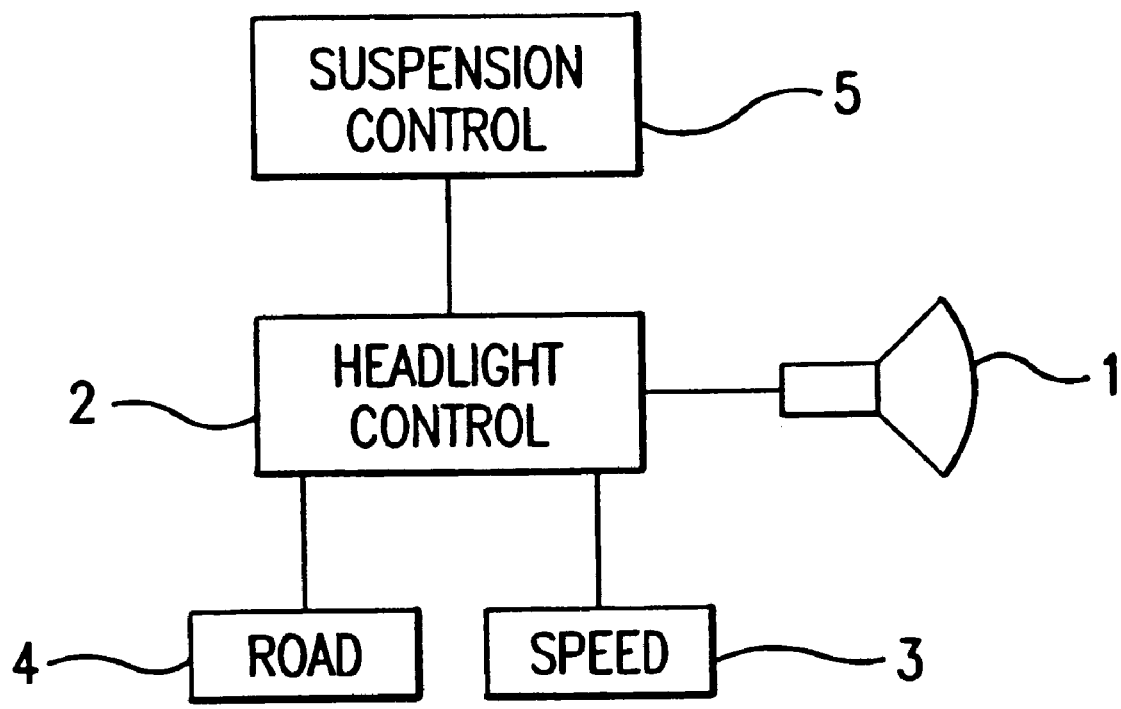
FIG. 1 is a schematic depiction of a headlight control arrangement for performing the method according to the invention.

FIG. 1 is a schematic illustration which shows an example of an apparatus for performing the method according to the invention. It includes a headlight unit 1, which is controlled by a headlight control unit 2 by adjusting the tilt of the headlights in the manner described previously. A speed sensor 3, which may detect vehicle speed in a conventional manner, provides an input signal to the control unit 2 for regulation of the headlight range according to the invention. (The sensor 3 may be, for example, a speed sensor which is otherwise already present on the vehicle as a part of a traction control system or ABS.) In addition, a sensor is provided to detect the road surface condition, and a signal is also input to the headlight control unit 2 from a suspension control unit 5.

Figure 2:
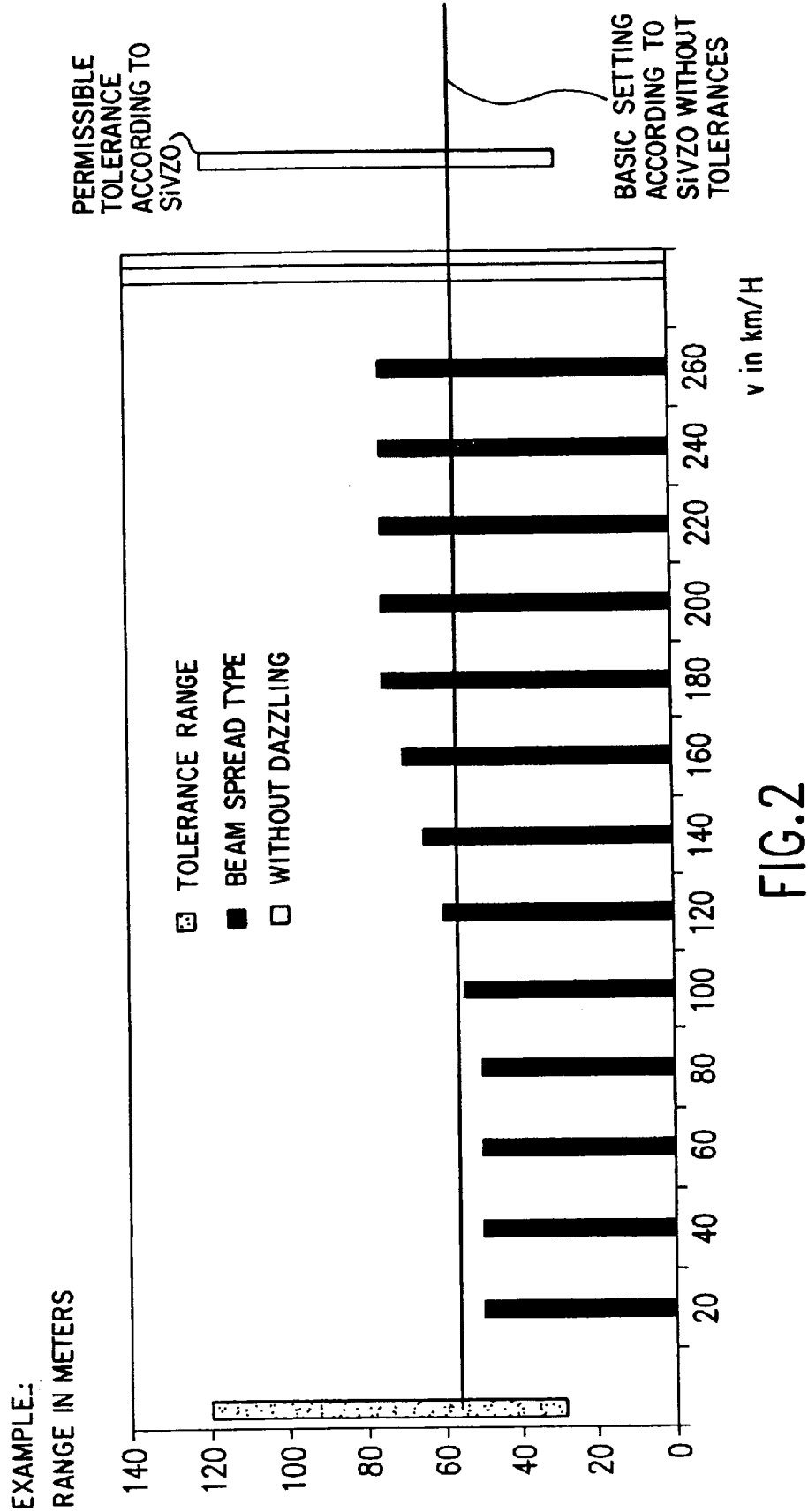
FIG. 2 is a graphic illustration of the manner of adjusting the headlight range of a vehicle as a function of vehicle speed according to the invention.

In FIG. 2 of the drawing, the dark columns form a bar graph which illustrates the adjustment of the headlight range as a function of speed, in a total of 5 steps from 50 to 75 meters, for representative speeds of 80, 100, 120, 140, 160, and 180 km/hour. The legally permitted tolerance range for a legally prescribed basic headlight setting of 55 meters is plotted as a gray column at the left edge of the graph. It comprises headlight ranges from 30 to 120 meters. The maximum value for the headlight range (120 meters) is about 65 meters above the legally prescribed value of 55 meters. For the assumed maximum set value of the headlight range of 75 meters, taking this tolerance into account, a maximum value for the headlight range is obtained that totals 140 (75+65) meters and still does not blind the oncoming traffic.

In the invention, the headlight range is adapted to the actual needs of the driver. That is, the headlight range is increased at higher speeds, so that an increase in the visual field is achieved. At low speeds, the headlight range remains at the usual value of 50 meters as described above. In this manner, it is possible to achieve an illumination of the highway, even with low beams, that takes the needs of persons driving in traffic into account, of course, blinding of oncoming traffic is avoided even when the headlight range is increased.

With a vehicle that is standing still or almost at rest (a speed of 2 km/hour or less, for example) on the other hand, the headlight range can be reduced to a value that is less than the legally prescribed basic setting of 55 meters. It can be 40 meters, for example. As a rule, this value is sufficient to meet the visual needs of the driver and also offers the advantage of avoiding blinding other drivers or even the feeling of being blinded.

In a preferred embodiment of the invention described in the following, the goal is to avoid blinding oncoming traffic, even with the influence of factors that result from the interaction between the highway and the vehicle. This goal is achieved by taking into account the state and/or surface quality of the road being traveled.

Although vehicles have a suspension comfort that is constantly being improved, the influence of rough and uneven highways on the steering of the vehicle (and hence on its headlights) cannot be completely eliminated. As a result, an opposite effect is produced by the quality of the highway during the logical and advantageous increase in headlight range at higher speeds.

Accordingly, within the scope of the invention, with a rough and/or corrugated surface of the road, the headlight range can be reduced relative to a smooth, flat surface. This measure can be utilized even at low speeds, at which speed-dependent increase in the headlight range of the vehicle has not yet been performed.

In addition, the suspension properties of the vehicle can also be taken into account. With the increasing use of regulated spring/shock absorber systems, it is possible, even with changing suspension characteristics of the vehicle, to set the headlight range to the maximum possible value at all times. As a rule however the value is above the basic value of 50 meters as given above.

The information concerning the condition of the road can be obtained by means of well known conventional sensor arrangements, such as disclosed for example in German patent document DE 36 24 493A, provided for adjusting the suspension properties. This results in a reduction of the sensor elements required for working the invention. However it is also possible to obtain information about the condition of the road from a separate system of sensors, such as disclosed for example in German patent document DE 3738221 A or from other existing sensorics. This could include a conventional acceleration sensor such as is used to detect a collision, trigger an airbag or the like. Information concerning vehicle acceleration can be obtained from conventional acceleration sensors. German patent document 36 24 496.B1, for example, discloses an acceleration sensor that is located in the vehicle suspension system. Any such sensing arrangement would be suitable for this purpose however.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. In a method for regulating the headlight range of a motor vehicle as a function of the load, a method for taking into account vehicle speed and road condition, comprising:

detecting speed of said motor vehicle;

detecting a surface condition of a surface on which the vehicle is operated;

adjusting said headlight range as a function of said vehicle speed by increasing said headlight range at relatively higher vehicle speed and decreasing said headlight range at relatively lower vehicle speed; and when the surface of the road is rough or uneven, reducing the headlight range relative to a value applied for a smooth, flat surface.

2. Method according to claim 1, wherein a total range for headlight adjustment falls within a tolerance range for the adjustment.

3. Method according to claim 1, wherein the headlight range adjustment is performed in accordance with discrete headlight range values associated with respective vehicle speed ranges.

4. Method according to one of claim 1, wherein the headlight range with the vehicle at rest is set to a value that is less than a value for a low vehicle speed.

5. Method according to claim 1, wherein information about the condition of the road is obtained by means of sensors provided for adjusting suspension characteristics of the vehicle.

6. Method according to claim 1, wherein respective suspension characteristics of the vehicle are also taken into account.

* * * * *